US008385885B2

(12) United States Patent
Hainzl (10) Patent No.: US 8,385,885 B2
(45) Date of Patent: Feb. 26, 2013

(54) METHOD OF UNLOCKING A MOBILE ELECTRONIC DEVICE

(75) Inventor: Richard Andreas Axel Hainzl, Sollentuna (SE)

(73) Assignee: Sony Ericsson Mobile Communications AB, Lund (SE)

( * ) Notice: Subject to any disclaimer, the term of this patent is extended or adjusted under 35 U.S.C. 154(b) by 818 days.

(21) Appl. No.: 12/288,300

(22) Filed: Oct. 17, 2008

(65) Prior Publication Data

US 2010/0099394 A1  Apr. 22, 2010

(51) Int. Cl.
*H04M 1/66* (2006.01)
(52) U.S. Cl. ......... 455/411; 455/418; 455/566; 345/173
(58) Field of Classification Search ................. 455/411, 455/418, 566; 345/173
See application file for complete search history.

(56) References Cited

U.S. PATENT DOCUMENTS

| | | | |
|---|---|---|---|
| 5,844,249 A * | 12/1998 | Takano et al. ............... 356/237.1 |
| 6,476,797 B1 | 11/2002 | Kurihara et al. | |
| 7,899,499 B2 * | 3/2011 | Kang et al. ..................... 455/566 |
| 2003/0217873 A1 * | 11/2003 | Paradiso et al. ............. 178/18.04 |
| 2005/0162402 A1 * | 7/2005 | Watanachote ................. 345/173 |
| 2005/0253817 A1 * | 11/2005 | Rytivaara et al. ............. 345/173 |
| 2006/0125971 A1 * | 6/2006 | Abileah et al. ................. 349/42 |
| 2006/0209041 A1 * | 9/2006 | Studt et al. .................... 345/173 |
| 2006/0284858 A1 * | 12/2006 | Rekimoto ...................... 345/173 |
| 2007/0139383 A1 * | 6/2007 | Chen .............................. 345/168 |
| 2007/0146894 A1 * | 6/2007 | Humpston ..................... 359/666 |
| 2007/0190334 A1 * | 8/2007 | Araki et al. ................... 428/421 |
| 2008/0079846 A1 * | 4/2008 | Ikari .............................. 348/373 |
| 2008/0259046 A1 * | 10/2008 | Carsanaro ..................... 345/173 |
| 2010/0009658 A1 * | 1/2010 | Wu et al. ....................... 455/411 |
| 2012/0032903 A1 * | 2/2012 | Yamamoto et al. ........... 345/173 |

FOREIGN PATENT DOCUMENTS

| | | |
|---|---|---|
| EP | 1691263 | 8/2006 |
| WO | 2004/001560 A1 | 12/2003 |
| WO | 2008/030594 | 3/2008 |

OTHER PUBLICATIONS

International Preliminary Report on Patentability for PCT/EP2009/002763, mailed Jan. 18, 2011.
R. M. Crowder, "Tactile sensing," Automation and Robotics, Jan. 1998, pp. 1-5, XP002538942.

* cited by examiner

*Primary Examiner* — Jinsong Hu
*Assistant Examiner* — Qun Shen
(74) *Attorney, Agent, or Firm* — Edwards Wildman Palmer LLP; Peter F. Corless; Steven M. Jensen (57) ABSTRACT

A method of unlocking a mobile electronic device and a mobile electronic device are disclosed. The mobile electronic device is operable in a locked state with the touch screen of the mobile electronic device being deactivated. In an embodiment, the mobile electronic device comprises a pressure sensor coupled to the touch-screen for detecting an application of pressure to the touch screen.

11 Claims, 6 Drawing Sheets

METHOD OF UNLOCKING A MOBILE ELECTRONIC DEVICE

FIELD OF THE INVENTION

The present invention relates to a method of unlocking a mobile electronic device. The invention further relates to mobile electronic devices, such as mobile phones, personal digital assistants, portable music players and the like.

BACKGROUND

Mobile electronic devices incorporating a touch screen have become increasingly popular in recent years. A touch screen offers a fast and flexible control of a mobile electronic device. Conventional touch screens use e.g. a resistive touch panel to detect a single touch, whereas more advanced touch screens may use a capacitive touch screen panel capable of detecting multiple simultaneous touches. This so-called multi-touch technology can also be realized using an optical touch screen, wherein optical sensors are integrated in e.g. an LCD display matrix.

When a mobile electronic device is transported by a user, it is often brought into a locked state, or sleep mode, wherein the touch screen of the mobile electronic device is deactivated. In the locked state, an accidental activation of control elements is prevented, and power consumption is reduced. Locking and unlocking of such a mobile electronic device generally occurs by using dedicated mechanical buttons. For example for unlocking the device, a first button has to be pressed, upon which a screen is activated with instructions for pressing a second button. After pressing the second button, the mobile electronic device is finally unlocked.

In such a conventional mobile electronic device, the screen is activated even if the first button is only accidentally pressed, e.g. when carrying the device in a pocket. This leads to an undesirable increase in power consumption. Further, mechanical buttons need to be provided. These require additional space on a face plate of the mobile electronic device. Even though two buttons may need to be pressed, this may also accidentally occur when carrying the device in a pocket, resulting in operation of the device in an unlocked mode. Accordingly, the device may unintentionally be operated, which may lead to an unwanted placement of calls and associated costs, as well as a reduced battery life. It is thus desirable to provide a more controlled unlocking of the mobile electronic device. The unlocking mechanism should also be user-friendly, i.e. provide a straight forward and ergonomic unlocking of the device. It is also desirable to reduce the amount of space required by mechanical control elements, so that a large display can be realized.

SUMMARY OF THE INVENTION

Accordingly, there is a need for improving the unlocking of a mobile electronic device.

According to an aspect of the invention, a method of unlocking a mobile electronic device is provided. The mobile electronic device is in a locked state with a touch screen of the mobile electronic device being deactivated. The method comprises detecting with at least one pressure sensor coupled to the touch screen an application of pressure to the touch screen. In response to the detecting of an application of pressure, it is determined if an unlock event occurred. If an unlock event occurred, the mobile electronic device is unlocked by activating the touch screen.

By using at least one pressure sensor, additional mechanical control elements may not be required for unlocking the mobile electronic device. Further, a display of the touch screen may not need to be activated during the unlocking procedure, which will result in a reduced power consumption. An unlock event may be a predetermined actuation of the touch screen or of the at least one pressure sensor or a combination thereof. Unlocking the mobile electronic device in response to the occurrence of an unlock event may thus prevent an accidental unlocking.

According to an embodiment of the invention, the determining if an unlock event occurred comprises activating at least a touch sensitive touch panel of the touch screen and detecting a touch of the touch screen as an input. If the detected input corresponds to a predetermined actuation of the touch screen, it is determined that an unlock event occurred. Using both the at least one pressure sensor and the touch panel of the touch screen may further increase the reliability of the unlocking of the device. As an example only, the predetermined actuation of the touch screen may be a touch of the touch screen by a predetermined object, a touch of the touch screen by an electrically grounded object, a predetermined movement of an object on the touch screen, a predetermined sequence of touches of the touch screen or a touch of the touch screen according to a predetermined pattern. A combination of these types of actuation is also conceivable. Unlocking the device in response to a touch with a grounded object, such as a person's finger, may for example be user-friendly, yet still reliable, as the touch screen may generally not be touched by any other grounded object when carrying the mobile electronic device in a pocket.

According to another embodiment, the pressure sensor is coupled to a first portion of the touch screen, the mobile electronic device further comprising at least one second pressure sensor coupled to a second portion of the touch screen for determining an area of the touch screen to which the pressure is applied.

In such a configuration, it may be determined that an unlock event occurred if an application of pressure according to a predetermined sequence to different areas of the touch screen is detected. Thus, the touch screen may not need to be activated at all, and power consumption can be further reduced.

The determining if an unlock event occurred may only be performed in response to detecting an application of pressure according to a predetermined sequence to different areas of the touch screen. As an example, only after detecting said predetermined sequence, a touch panel of the touch screen may be activated in the process of determining if an unlock event occurred. This has the advantage that if pressure is only accidentally applied to the touch screen, the determining if an unlock event occurred may not be performed, resulting in a conservation of power.

The application of the pressure to the touch screen may only be detected if the applied pressure has a magnitude above a predetermined pressure threshold. A further protection against unwanted activation may thus be achieved.

According to another aspect of the invention, a mobile electronic device being operable in a locked state with a touch screen of the mobile electronic device being deactivated is provided. The mobile electronic device comprises at least one pressure sensor coupled to the touch screen and adapted to detect an application of pressure to the touch screen. The mobile electronic device further comprises a control unit adapted to determine if an unlock event occurred when the mobile electronic device is operating in the locked state and in response to the pressure sensor detecting an application of pressure to the touch screen. The control unit is further adapted to unlock the mobile electronic device by activating the touch screen if an unlock event occurred. Such a mobile electronic device may achieve similar advantages as outlined above with respect to the above-mentioned method.

According to an embodiment of the invention, the pressure sensor comprises a piezoelectric sensor.

The pressure sensor may comprise a polyvinylidene fluoride (PVDF) film. Such a sensor may be easily attached to the back of the touch screen and may be capable of delivering an electrical signal in response to an application of pressure to the touch screen. It may further require hardly any power to be operated and may be mounted in a small space.

According to another embodiment, the touch screen comprises a touch-sensitive touch panel. The control unit is adapted to determine if an unlock event occurred by activating at least the touch panel, detecting a touch of the touch screen as an input and if the detected input corresponds to a predetermined actuation of the touch screen, determining that an unlock event occurred. As only the touch panel of the touch screen may be activated, a further reduction in power consumption may be achieved.

According to another embodiment, the mobile electronic device comprises at least two pressure sensors-coupled to different portions of the touch screen, the control unit being adapted to determine an area of the touch screen to which pressure is applied when detecting the application of pressure to the touch screen by the at least two pressure sensors.

The control unit may be adapted to determine that an unlock event occurred if the application of pressure according to a predetermined sequence to different areas of the touch screen is detected.

The mobile electronic device according to yet another embodiment may further comprise a filter adapted to filter the pressure signal delivered by the at least one pressure sensor to said control unit. The filtering is performed so that the control unit is only informed of the application of pressure to the touch screen if the applied pressure has a magnitude above a predetermined pressure threshold.

The mobile electronic device may for example be a mobile phone, a personal digital assistant, a personal navigation device, a digital camera or a portable music player, or the like.

According to another embodiment, the touch screen comprises a display, the at least one pressure sensor being a contact or an electrical switch integrated into the display. A compact assembly of the touch screen may thus be achieved.

According to another aspect of the invention, a method of operating a mobile electronic device is provided. The mobile electronic device is in a locked state with a touch screen of the mobile electronic device being deactivated. The method comprises receiving at least-one pressure signal from at least one pressure sensor coupled to the touch screen in response to an application of pressure to the touch screen. At least a touch panel of the touch screen is activated in response to receiving the pressure signal. An input signal from the touch panel is received in response to a touch of the touch screen. If the received input signal corresponds to a predetermined actuation of the touch screen, the mobile electronic device is operated in an unlocked state with the touch screen being activated.

The touch panel may only be activated if the pressure signal and at least one second pressure signal from a second pressure sensor coupled to the touch screen correspond to a predetermined actuation of the touch screen. A further protection against an accidental unlocking of the mobile electronic device may thus be provided.

According to another aspect of the invention, a mobile electronic device being operable in a locked state with a touch screen of the mobile electronic device being deactivated is provided. The touch screen comprises a touch panel and is adapted to deliver an input signal in response to a touch of the touch screen. The mobile electronic device comprises at least one pressure sensor coupled to the touch screen and adapted to deliver a pressure signal upon an application of pressure to the touch screen. The mobile electronic device further comprises a control unit adapted to activate at least the touch panel in response to receiving the pressure signal from the pressure sensor when the mobile electronic device is operating in the locked state. The control unit is further adapted to operate the mobile electronic device in an unlocked state with the touch screen being activated if the input signal received from the touch panel in response to a touch of the touch screen corresponds to a predetermined actuation of the touch screen.

The touch panel may for example be a capacitive touch screen panel, a resistive touch screen panel, an optical touch screen panel, a total internal reflection based touch screen panel or the like.

It is to be understood that the features mentioned above and those yet to be explained below can be used not only in the respective combinations indicated, but also in other combinations or in isolation, without leaving the scope of the present invention. As an example, features of the methods described may be implemented in a mobile electronic device, whereas an embodiment of an inventive method may make use of features described with respect to a mobile electronic device.

BRIEF DESCRIPTION OF THE DRAWINGS

The foregoing and other features and advantages of the invention will become further apparent from the following detailed description read in conjunction with the accompanying drawings in which like reference numerals refer to like elements, wherein.

DETAILED DESCRIPTION OF THE INVENTION

In the following, embodiments of the present invention will be described in detail with reference to the accompanying drawings. It is to be understood that the following description of embodiments is given only for the purpose of illustration and is not to be taken in a limiting sense. The scope of the invention is not intended to be limited neither by the embodiments described hereinafter nor by the drawings, which are taken to be illustrative only, but is intended to be limited only be the appended claims and equivalents thereof.

It should be noted that the drawings are to be regarded as being schematic representations only, and elements in the drawings are not necessarily to scale with each other. Rather, the representation of the various elements is chosen such that their function and general purpose become apparent to a person skilled in the art. It should be appreciated that the partitioning of embodiments-in functional blocks or units shown in the drawings is not to be construed as indicating that these units necessarily are implemented as physical separate units, but functional blocks or units shown or described may be implemented as separate units, circuits, chips or circuit elements, but one or more functional blocks or units may as well be implemented in a common circuit, chip, circuit element or unit.

Figure 1:
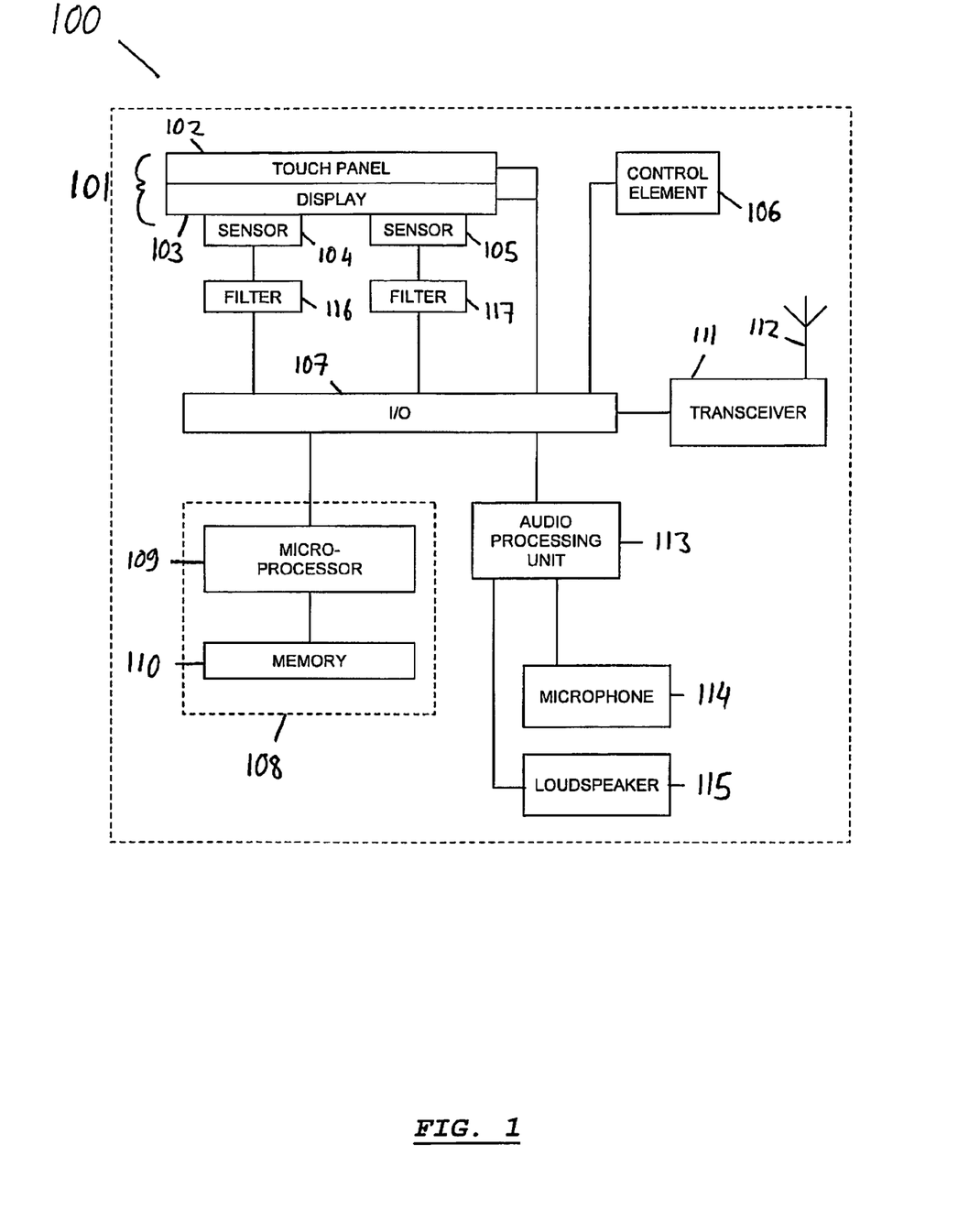
FIG. 1 is a schematic block diagram of an embodiment of a mobile electronic device according to the invention.

Turning now to FIG. 1, a mobile electronic device 100 according to an embodiment of the present invention is shown. Mobile electronic device 100 comprises a touch screen 101 with a touch panel 102 and a display 103. The touch panel 102 is a component of touch screen 101 which is sensitive to a touch to a surface of the touch screen 101. It may be provided as a touch sensitive layer arranged as an upper surface of display 103, but may also be integrated in display 103. The touch panel is thus to be understood as a component implementing a touch sensing technique. Examples are a resistive touch screen panel detecting a connection between resistive layers, a capacitive touch screen panel detecting change in capacitance due to a touch, an optical touch screen, which detects a touch by optical sensors implemented in the display, and the like. A touch screen is generally capable of resolving a position on its surface at which a touch occurred. Some touch screens, e.g. using a resistive touch screen panel, are capable of resolving only the position of a single touch, whereas others, such as a capacitive touch screen panel, are capable of resolving positions of multiple simultaneous touches.

In response to a touch, touch screen 101 delivers a corresponding signal or position information as an input to control unit 108 via input/output unit 107. Control unit 108 interprets the detected touch, for example in accordance with graphical control element displayed on display 103. Display 103 may receive a display signal via input/output unit 107 from control unit 108, or from a dedicated graphics processing unit (not shown). On display 103, information, such as text, images, videos and the like, as well as control elements, function menus, or any other graphical elements for operating mobile electronic device 100 may be displayed. Display 103 may be a liquid crystal display (LCD), such as a thin film transistor (TFT) LCD, and may incorporate the touch panel 103, as mentioned above.

The operation of the mobile electronic device 100 is controlled by the control unit 108 comprising microprocessor 109 and memory 110. Microprocessor 109 may execute programs stored in memory 110. Microprocessor 109 may have the form of a single microprocessor, or multiple microprocessors, and may include general purpose or special purpose microprocessors and digital signal processors. Memory 110 may include several types of memory used in the mobile electronic device 100, such as random access memory (RAM), read-only memory (ROM), and other non-volatile memory, such as flash memory and the like. Non-volatile memory may also include EPROM or EEPROM and may be provided internal to the mobile communication device 100 or in removable form, such as a memory card or in a combination thereof.

Control unit 108 controls display 103 and interprets input signals received by touch panel 102 in accordance with programs running on microprocessor 109. Control unit 108 performs a particular function in response to a corresponding user input via touch screen 101. Control unit 108 may for example deactivate touch screen 101, i.e. deactivate the display 103 and the touch panel 102, and operate the mobile electronic device 100 in a locked state in response to receiving an input signal corresponding to an actuation of particular graphical control elements on the touch screen by a user. Apart from actuating one or more graphical control elements, there are several different ways in which a user may give a lock command to control unit 108 of mobile electronic device 100. The user may for example move an input object, such as a stylus, in a pre-determined way over touch screen 101. In response to receiving a lock command, control unit 108 may, apart from touch screen 101, deactivate further components of device 100, and may operate the device in a stand-by mode, in which power consumption is reduced.

Mobile electronic device 100 further comprises sensors 104 and 105. Sensors 104 and 105 are pressure sensors capable of detecting an application of pressure to touch screen 101. To that end, they are mechanically coupled to the touch screen 101. Sensors 104 and 105 may be for example piezoelectric sensors, such as a polyvinylidene fluoride (PVDF) film. Sensors 104 and 105 are mounted to the backside of touch screen 101 using e.g. an adhesive, or a mechanical mounting method. The sensors may be for example sandwiched between the touch screen and a supporting backplate (not shown). The pressure sensors may also be simple electrical switches performing a switching action in response to a pressure application to the touch screen 101. As such, the sensors may also be in-cell contacts or in-cell electrical switches integrated into the display 103.

When implemented as piezoelectric sensors, an application of pressure to touch screen 101 will result in an application of pressure to the sensors, which will generate a voltage signal in response. The signal gives a measure of the pressure applied to the sensor, and may thus be considered a pressure signal. An advantage of using a PVDF film as a pressure sensor is that it can be thin, hardly requiring any mounting space. A pressure signal can be further obtained with hardly any travel or movement of touch screen 101, to which the pressure is applied. Mounting of the touch screen in the mobile electronic device may thus require no or only a very small modification to enable a detection of a pressure application. Nevertheless, it should be clear that sensors other than piezoelectric sensors may be used for detecting a pressure application to touch screen 101. The touch screen may for example be implemented using an organic light emitting diode (OLED) display, with mechanical pressure sensors, e.g. simple electrical switches, arranged on its backside. As a soft screen can be realized with such a display, an application of pressure to the screen could be easily detected by the mechanical pressure sensors.

Sensors 104 and 105 interface filters 116 and 117, respectively. Each filter can perform a filtering and possibly an analog to digital conversion of a voltage signal received from the respective sensor. The filter may example use a voltage threshold corresponding to a pressure threshold for the application of pressure to the touch screen, wherein a voltage signal from the sensor below the voltage threshold is discarded, whereas a voltage signal above the voltage threshold is forwarded as a pressure signal via input/output unit 107 to control unit 108. Thus, only a pressure application to touch screen 101 above a predetermined pressure threshold is registered at control unit 108.

Filters 116 and 117 may deliver a binary signal, e.g. '0' for no application pressure and '1' for an application of pressure, or a signal corresponding to the magnitude of applied pressure to control unit 108. Filters 116 and 117 may thus perform an analog to digital conversion of a signal delivered by sensors 104 and 105. Yet filters 116 and 117 may also be implemented as software running on microprocessor 109. An analog to digital conversion of signals delivered by sensors 104 and 105 may then be formed in another unit.

If control unit 108 operates mobile electronic device 100 in the locked state, touch screen 101 is deactivated, whereas sensors 104 and 105 are active. An application of pressure to touch screen 101 with a magnitude about the mentioned pressure threshold is thus reported to control unit 108. As two sensors 104 and 105 are provided, control unit 108 is capable of resolving the area of the touch screen 101 to which the pressure was applied, e.g. left side or right side, depending on where sensors 104 and 105 are mounted. Control unit 108 will then determine whether the application of pressure was an attempt by a user to unlock the mobile electronic device 100, or was just an accidental pressure application, i.e. a false alarm. The determination may be performed by checking for a predetermined input sequence via sensors 104 and 105 and/or touch panel 102. If such a predetermined sequence is input by a user, control unit 108 determines that an unlock event occurred. Possible configurations of such an input sequence are described in more detail with reference to FIGS. 4-6 further below. In the case where a particular actuation of touch panel 102 may be required for unlocking mobile electronic device 100, control unit 108 will activate touch panel 102 after detecting the application of pressure to the touch screen 101. Control unit 108 can then receive an input signal from touch panel 102 via input/output unit 107, on the basis of which it will determine whether an unlock attempt was made. Display 103 does not need to be activated in the process, whereby energy is saved. If an occurrence of an input event can not be determined by control unit 108, touch panel 102 is again deactivated, and mobile electronic device 100 continues to operate in the locked state. In case the predetermined input sequence corresponding to an unlock event is detected, control unit 108 activates display 103 and possibly other components of device 100, and operates device 100 in an unlocked state.

By using sensors 104 and 105, device 100 does not need to comprise additional mechanical buttons for unlocking device 100. Further, touch screen 101 can be deactivated in the locked state, and only touch panel 102 is activated in the process of checking for an unlock attempt. Other embodiments may only make use of sensors 104 and 105 for determining if an unlock event occurred. Accordingly, the energy consumption of device 100 in the locked state is reduced. Filters 116 and 117 further ensure that a checking for an unlock event is only performed if pressure with a certain magnitude is applied to touch screen 101. Device 100 thus provides a reliable unlock mechanism which efficiently prevents an unintentional operation of mobile electronic device 100, without the need for any mechanical buttons.

Mobile electronic device 100 may still comprise one or more control elements 106. This may for example be a mechanical switch for turning the mobile electronic device on or off. Yet it should be clear that this is optional, and that mobile electronic device 100 may not comprise any mechanical control elements.

Mobile electronic device 100 may for example be implemented as a mobile phone. It may thus comprise additional components, such as audio-processing unit 113 interfacing microphone 114 and loudspeaker 115. Microphone 114 may record a voice signal of a user, and audio-processing unit 113 may convert such a signal to a digital speech signal and provide it to microprocessor 109 via input/output unit 107. Similarly, a sound signal that is to be given out to a user, such as a voice signal of an incoming call, can be provided directly from transceiver 111 or via microprocessor 109 to audio-processing unit 113. Audio-processing unit 113 may convert such a signal, which is generally available in a digital format, to an analog signal which is then given out by loudspeaker 115. A communication with another mobile phone via transceiver 111 and antenna 112 may thus be enabled. Other applications may of course also be implemented, such as the recording of a voice note using microphone 114, or the playback of audio files using loudspeaker 115. Transceiver 111 is coupled to antenna 112 for receiving and transmitting signals. Transceiver 112 may for example be operational to communicate with cellular network base stations, it may be a fully functional cellular radio transceiver. The transceiver 112 may operate according to any known standard, such as the global system for mobile communications (GSM), UMTS, TEA/EIA-136, CDMA One, CDMA 2000, wideband CDMA and the like.

Mobile electronic device 100 may also be any other kind of portable electronic device with a touch screen, for example a personal digital assistant, a personal navigation device, a digital camera, a portable music player and the like. It should be noted that in FIG. 1, only some components of the mobile electronic device are shown, and that the mobile electronic device may or may not comprise further components depending on the type of device. Also, some of the components shown in FIG. 1 are optional. For example, a PDA or a portable music player may not comprise a transceiver 111 and an antenna 112, whereas a digital camera may not comprise units 111-115. It should be clear that the mobile electronic device may also only comprise one of the sensors 104 and 105, or more sensors, and may not be equipped with filters 116 and 117.

Figure 2:
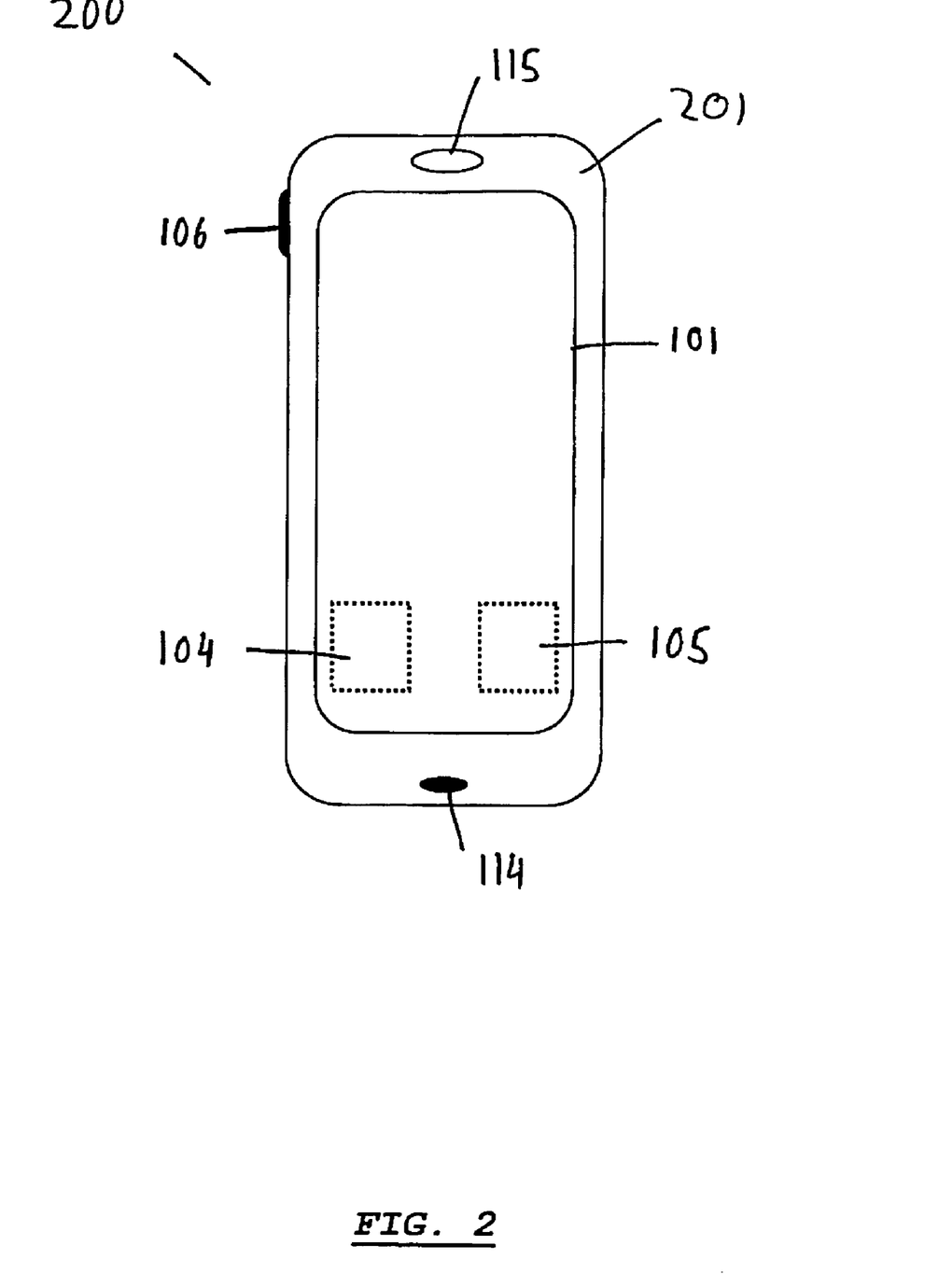
FIG. 2 is a schematic drawing of an embodiment of a mobile electronic device in the form of a mobile phone.

FIG. 2 is a top view of an implementation of mobile electronic device 100 as a mobile phone 200. Touch screen 101 is mounted level with a face plate 201 of mobile phone 200. Mobile phone 200 further comprises microphone 114, loudspeaker 115 and mechanical button 106. Pressure sensors 104 and 105 are arranged underneath touch screen 101 (shown as dotted rectangles). Only the areas of touch screen 101 above sensors 104 and 105 may thus be sensitive to pressure. By providing the two sensors, control unit 108 is enabled to determine if a pressure application occurred to the left-hand side or the right-hand side of touch screen 101. It should be clear that further pressure sensors may be provided, so as to resolve the application of pressure to different areas of the touch screen 101.

Figure 3:
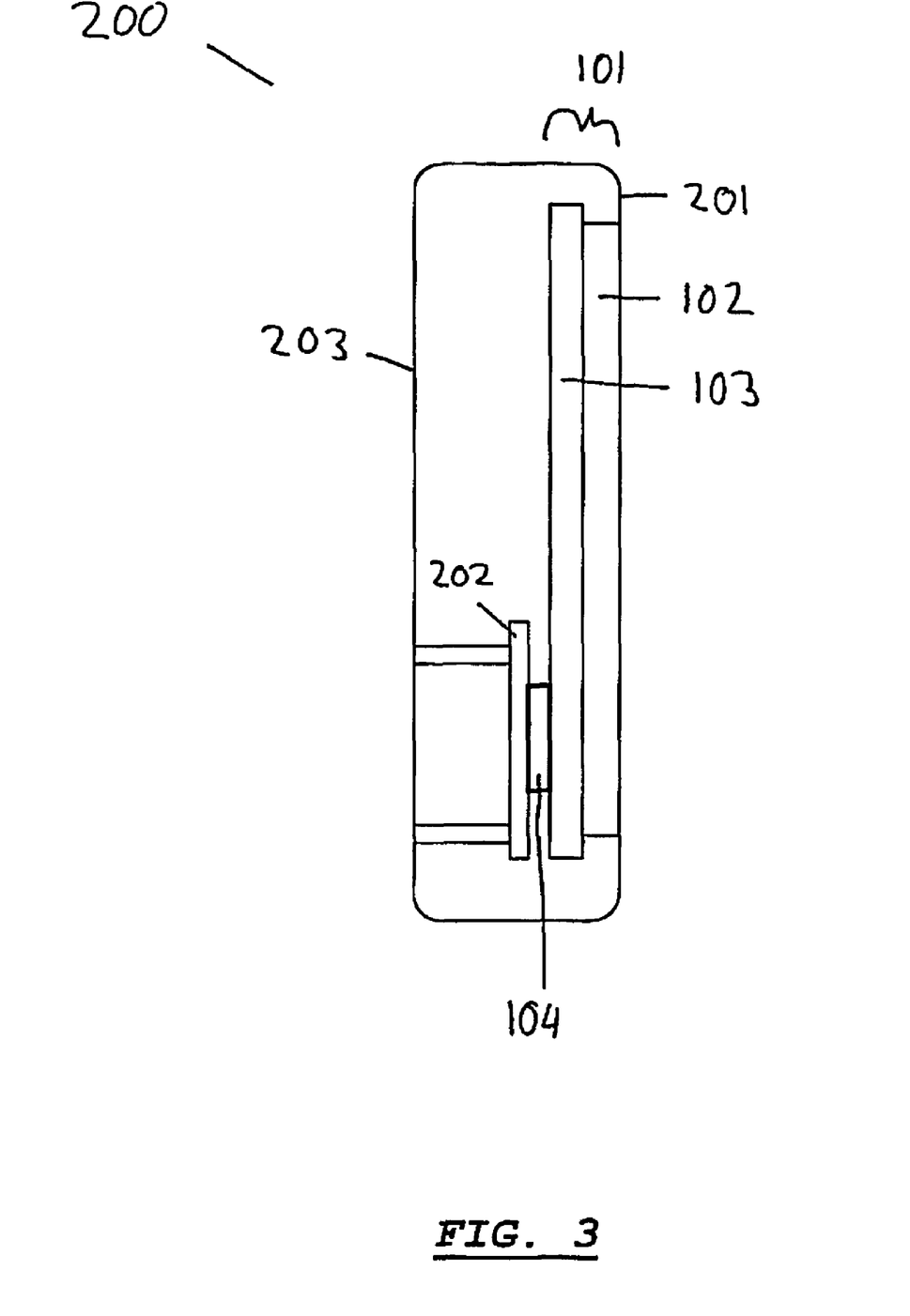
FIG. 3 is a schematic drawing of a sectional side view of a mobile electronic device according to an embodiment of the invention.

FIG. 3 shows schematically a sectional side view of mobile phone 200. Sensor 104 visible in the side view is mounted to the backside of touch screen 101 comprising display 103 and touch panel 102. Sensor 104 is supported by support plate 202, so that pressure applied to a surface of touch screen 101 is transmitted to sensor 104, i.e. an opposing force to a pressure application is provided. Support plate 202 may be supported against the housing 203 of mobile phone 200. Mobile phone 200 may of course comprise further components, such as shown in FIG. 1, which are not shown in FIGS. 2 and 3 for the sake of simplicity. It must be emphasized that the components schematically shown in FIG. 3 are not to scale, touch panel 102 may for example be rather thin compared to the thickness of housing 203.

When implemented as a piezoelectric sensor, sensor 104 can already deliver a meaningful pressure signal even when experiencing only very little deformation. For detecting a pressure application to touch screen 101 by such a sensor, touch screen 101 needs to move only a very small distance towards sensor 104. Touch screen 101 does accordingly not require a sophisticated support structure, and may be mounted level with the face plate 201.

Different methods of unlocking a mobile electronic device will now be described with reference to FIGS. 4, 5 and 6. Although reference will be made to the mobile phone 200 of FIG. 2 in the following description, it should be noted that this explanation is clearly non-restrictive for the present invention, and that the methods may be implemented with any type of mobile electronic device comprising a pressure sensor and a touch screen.

Figure 4:
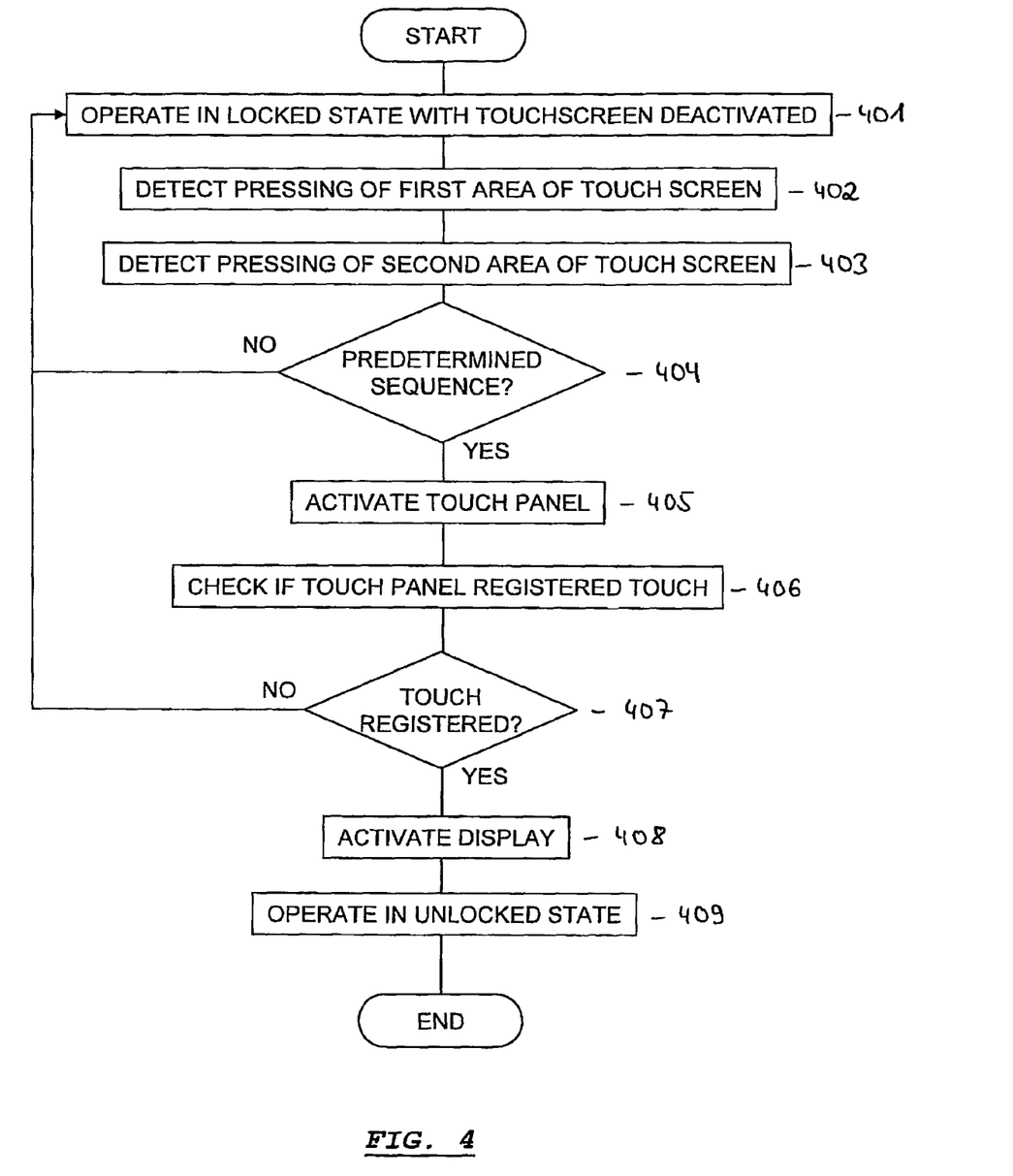
FIG. 4 is a flow diagram of a method according to an embodiment of the invention illustrating an unlocking of a mobile electronic device by making use of a pressure sensor and a touch panel.

In the embodiment of a method according to the invention as illustrated in the flow diagram of FIG. 4, a mobile electronic device is operated in a locked state with a touch screen deactivated in step 401. In step 402, a pressing of a first area of the touch screen 101 of FIG. 2 is detected. In step 403, a pressing of a second area of touch screen 101 is detected. A user may for example apply-pressure to an area above sensor 104 and 105, which is detected by the respective sensor. In step 404, it is checked whether the pressure application to touch screen 101 corresponds to a predetermined sequence. A predetermined sequence may for example be a subsequent pressing of a lower left and lower right area of touch screen 101. Other sequences are of course also possible, and may be more or less complex. A third sensor may for example be provided, with the predetermined sequence corresponding to a subsequent application of pressure to areas of the touch screen located above all three pressure sensors. If the pressure application does not correspond to the predetermined sequence, operation in the locked state is continued (step 401). An accidental activation of touch screen 101 can thus be prevented.

Yet, the predetermined sequence may still accidentally be applied to the touch screen. If the predetermined sequence was confirmed in step 404, the touch panel of touch screen 101 is thus activated in step 405. In step 406, it is checked if the touch panel registered a touch. For example when using a capacitive touch screen panel, a touch is only registered if a grounded object comes within a predetermined distance or touches the surface of the touch screen. A grounded object may for example be the finger of a user applying pressure to the touch screen, whereas other objects, such as objects carried together with the mobile electronic device in a pocket, may not be capable of triggering the registration of a touch by the touch panel. As the contact with such other objects will not be registered, it is possible to determine whether the detected application of pressure was just accidental, or was an actual attempt to unlock the mobile electronic device. If no touch is registered in step 407, operation in the locked state continues (step 401).

A touch may for example be registered when a user presses the second area of the touch screen when entering the predetermined sequence, e.g. if the activation of the touch panel occurs relatively fast. On the other hand, the user may additionally touch the touch screen for finalizing the unlocking sequence.

After detecting the predetermined sequence of pressure application and registering the touch, the control unit of the mobile electronic device determines that an unlock event occurred. Accordingly, it will activate the display in step 408, so that the whole touch screen is now activated, and operate the mobile electronic device in an unlocked state in step 409. The mobile electronic device may for example go from a stand-by mode into an active mode, in which the full functionality of the mobile electronic device is provided to a user.

Figure 5:
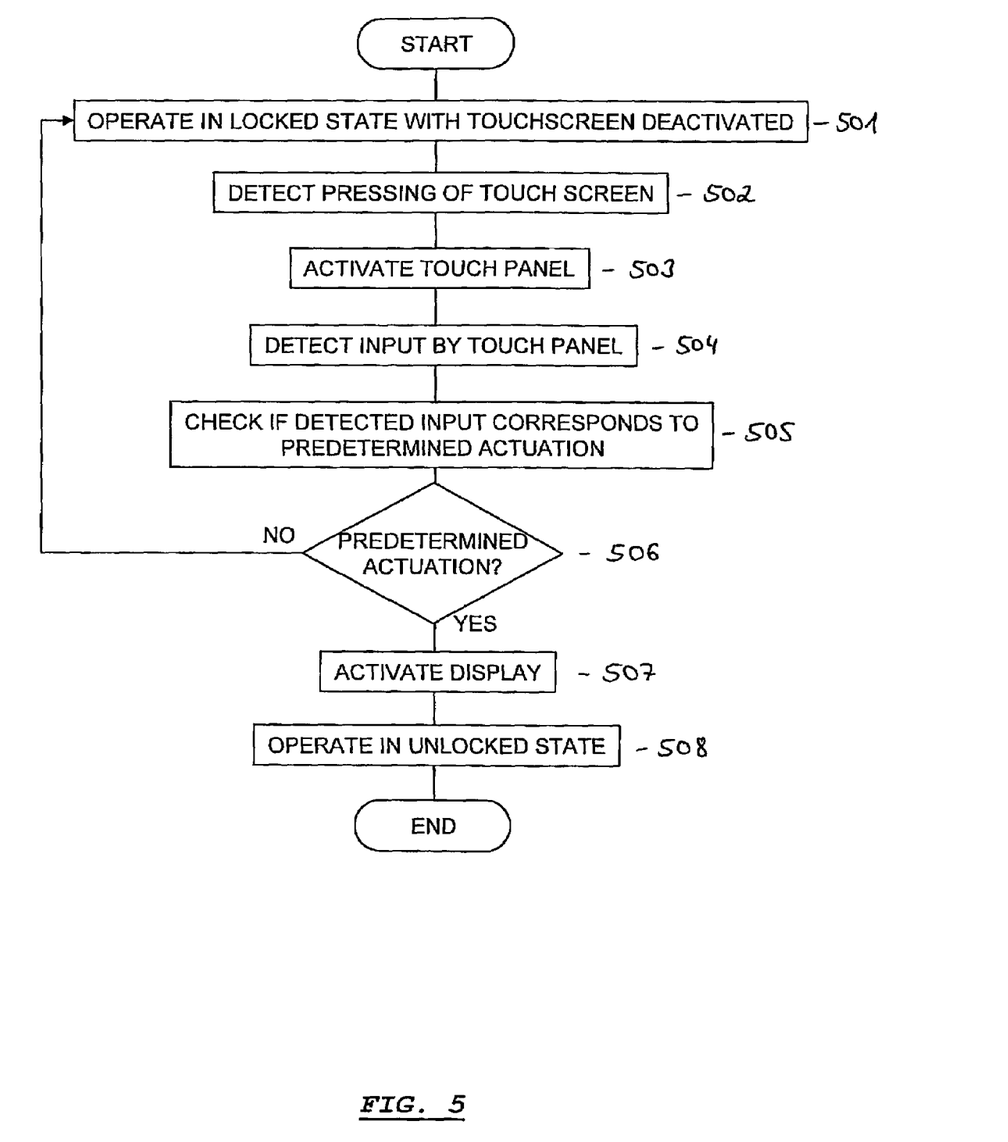
FIG. 5 is a flow diagram of an embodiment of a method according to the present invention.

For the embodiment described with respect to the flow diagram of FIG. 5, the mobile electronic device only needs to be provided with one pressure sensor. In step 501, the mobile electronic device is operated in a locked state with the touch screen being deactivated. A pressing of the touch screen is detected in step 502 by a single pressure sensor, or multiple pressure sensors. In response to detecting the pressing, the touch panel of the touch screen is activated in step 503. In step 504, an input is detected by the touch panel of the touch screen. An input may for example be detected in response to the user touching the touch screen at one or multiple locations, or sliding a finger or other object over the touch-sensitive surface of the touch screen. Upon such an actuation by the user, the touch panel generates an input signal which is e.g. evaluated by control unit 108. In step 505, the control unit checks if the detected input corresponds to a predetermined actuation of the touch screen. Such a predetermined actuation may be a simple touch of a capacitive touch screen, as mentioned with respect to FIG. 4. Yet it may be a more complex actuation, e.g. a double tap touch at a predetermined frequency to e.g. a resistive touch panel. Another example of a predetermined actuation may be a predetermined movement of a finger or another object on the touch-sensitive surface of the touch screen, e.g. from left to right, top to bottom or the like. Generally, the predetermined actuation can be adapted to the type of touch screen used. For example for an optical touch screen which is capable of recognizing multiple touches, the predetermined actuation may be a touch in a particular pattern, e.g. touching the surface of the touch screen with several fingertips located at predetermined positions, or moving several fingertips on a predetermined path across the surface of the touch screen. Of course it is also possible to combine the above-mentioned types of predetermined actuation, or to implement them on touch screens other than the ones mentioned above.

If it is determined that the detected input does not correspond to the predetermined actuation, the decision step 506 branches back to step 501, wherein the mobile electronic device continues to operate in a locked state. If the predetermined actuation was detected, the control unit determines that an unlocked event occurred. From decision step 506, the method thus continues with activating the display in step 507, so that the entire touch screen is activated, and operating the mobile electronic device in an unlocked state in step 508.

Figure 6:
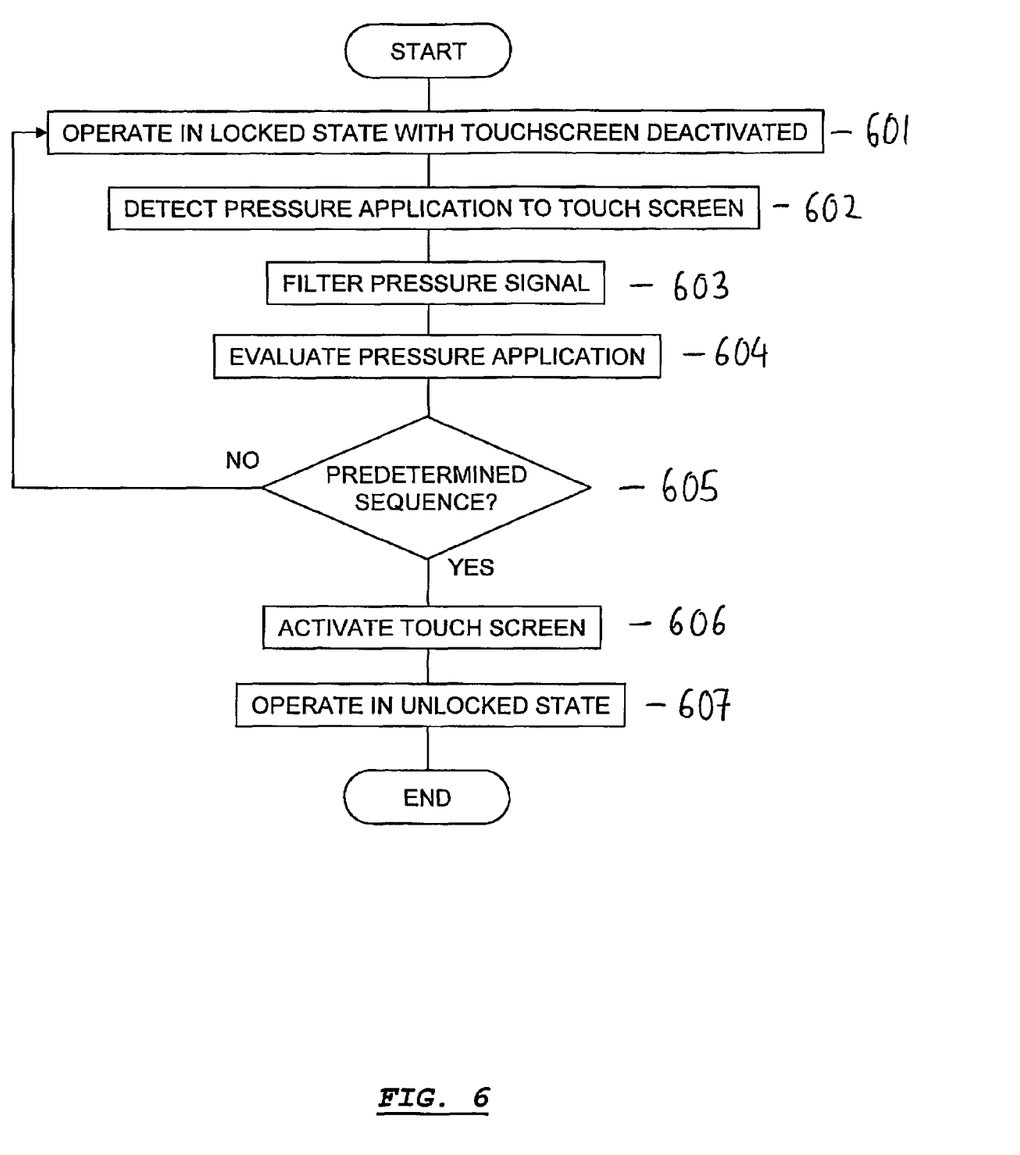
FIG. 6 is a flow diagram of an embodiment of a method according to the invention using a sequence of pressure application for unlocking a mobile electronic device.

Whereas in the embodiments of FIGS. 4 and 5, the touch panel of the touch screen was activated in order to determine whether an attempt to unlock the mobile electronic device was made, the embodiment of FIG. 6 uses only the pressure sensors to unlock the mobile electronic device. In a first' step 601, the mobile electronic device is again operated in a locked state with the touch screen being deactivated. A pressure application to the touch screen is detected in step 602. The touch screen 101 may for example be pressed one or more times in one or in several different areas. In response to each pressing, one or more pressure sensors will generate a pressure signal. The pressure signals are filtered in step 603. The filtering of the pressure signal is performed so that only a pressure application above a predetermined magnitude to the touch screen is registered. The pressure application to the touch screen, e.g. the filtered pressure signals, are then evaluated in step 604. In step 605, it is determined whether the detected pressure application corresponds to a predetermined sequence. A predetermined sequence may be the registration of a subsequent pressure application by sensors 104, 105, and again 104. It may also be the registration of a pressure application at only one sensor according to a predetermined temporal sequence, or a sequence of pressure application to more than just two distinct areas of the touch screen 101, e.g. using additional pressure sensors.

If the pressure application does not correspond to the predetermined sequence, the mobile electronic device continues to operate in the locked state (step 601). If the pressure application corresponds to the predetermined sequence, the method continues with an activation of the touch screen in step 606 and an operation of the mobile electronic device in an unlocked state in step 607.

It is to be understood that the features of the various embodiments described above may be combined with each other. As an example, the unlocking of the mobile electronic device may require a simultaneous application of pressure to one or more pressure sensors and a predetermined actuation of the touch screen. A thumb may for example be rolled from one side to another on the touch-sensitive surface of the touch screen, which movement is detected both by the pressure sensors and the touch panel of the touch screen. In response to detecting this type of thumb rolling by the pressure sensors and the touch panel, the control unit can determine that an unlock event occurred and unlock the mobile electronic device. Those skilled in the art will thus appreciate from the foregoing description that the broad teachings of the present invention can be implemented in a variety of forms.

Accordingly, while specific embodiments of the invention are disclosed herein, various changes and modifications can be made without departing from the scope of the invention. The present embodiments are to be considered in all respect as illustrative and non-restrictive, and all changes coming within the meaning and equivalency range of the appended claims are intended to be embraced therein.

The invention claimed is:

1. A method of unlocking a mobile electronic device, wherein the mobile electronic device is in a locked state with a touch screen of the mobile electronic device being deactivated, the method comprising the steps of:
    detecting with at least two pressure sensors coupled to different portions of the touch screen an application of pressure according to a predetermined sequence to different areas of the touch screen;
    if the application of pressure to the different areas of the touch screen according to the predetermined sequence is detected, activating only a touch-sensitive touch panel of the touch screen;
    detecting a touch of the touch panel as an input; and
    if the detected input corresponds to a predetermined actuation of the touch panel, unlocking the mobile electronic device by activating the whole touch screen.

2. The method of claim 1, wherein the predetermined actuation of the touch screen comprises at least one actuation selected from a group comprising a touch of the touch screen by a pre-determined object; a touch of the touch screen by an electrically grounded object; a predetermined movement of an object on the touch screen; a predetermined sequence of touches of the touch screen; and a touch of the touch screen according to a predetermined pattern.

3. The method of claim 1, wherein the application of the pressure to the touch screen is only detected if the applied pressure has a magnitude above a predetermined pressure threshold.

4. A mobile electronic device being operable in a locked state with a touch screen of the mobile electronic device being deactivated, said touch screen comprising a touch panel and being adapted to deliver an input signal in response to a touch of the touch screen, the mobile electronic device comprising:
    at least two pressure sensors coupled to different portions of the touch screen and each adapted to detect an application of pressure to the touch screen, only a touch-sensitive touch panel of the touch screen if it determines the application of pressure is according to a predetermined sequence to different areas of the touch screen based on detection by the at least two pressure sensors, detect a touch of the touch panel as an input, and unlock the mobile electronic device by unlocking the whole touch screen if the detected input corresponds to a predetermined actuation of the touch panel.

5. The mobile electronic device of claim 4, wherein at least one of the pressure sensors comprises a piezoelectric sensor.

6. The mobile electronic device of claim 4, wherein at least one of the pressure sensors comprises a polyvinylidene fluoride film.

7. The mobile electronic device of claim 4, further comprising a filter adapted to filter pressure signals delivered by said at least two pressure sensors to said control unit so that the control unit is only informed of the application of pressure to the touch screen if the applied pressure has a magnitude above a predetermined pressure threshold.

8. The mobile electronic device of claim 4, wherein the mobile electronic device is selected from a group comprising a mobile phone, a personal digital assistant, a personal navigation device, a digital camera and a portable music player.

9. The mobile electronic device of claim 4, wherein the touch screen comprises a display, the at least two pressure sensors each being a contact or an electrical switch integrated into the display.

10. The mobile electronic device according to claim 4, wherein the touch panel is selected from a group comprising a capacitive touch screen panel, a resistive touch screen panel, an optical touch screen panel, and a total internal reflection based touch screen panel.

11. A method of operating a mobile electronic device, wherein the mobile electronic device is in a locked state with a touch screen of the mobile electronic device being deactivated, the method comprising the steps of:
    receiving at least two pressure signals from at least two pressure sensors coupled to different portions of the touch screen in response to an application of pressure according to a predetermined sequence to different areas of the touch screen;
    if the application of pressure to the different areas of the touch screen according to the predetermined sequence is detected, activating only a touch-sensitive touch panel of the touch screen;
    detecting a touch of the touch panel as an input; and
    if the detected input corresponds to a predetermined actuation of the touch panel, operating the mobile electronic device in an unlocked state with said whole touch screen being activated.

* * * * *